(12) United States Patent
Chowdhury et al.

(10) Patent No.: US 7,835,324 B2
(45) Date of Patent: Nov. 16, 2010

(54) RESOURCE OPTIMIZATION IN A WIRELESS IP NETWORK

(75) Inventors: Kuntal Chowdhury, Plano, TX (US);
Jayshree Bharatia, Plano, TX (US);
Marvin Bienn, Dallas, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1164 days.

(21) Appl. No.: 10/409,917

(22) Filed: Apr. 9, 2003

(65) Prior Publication Data

US 2004/0022212 A1 Feb. 5, 2004

Related U.S. Application Data

(60) Provisional application No. 60/371,845, filed on Apr. 11, 2002, provisional application No. 60/373,357, filed on Apr. 17, 2002.

(51) Int. Cl.
*H04W 4/00* (2009.01)
*H04W 36/00* (2009.01)

(52) U.S. Cl. ............... 370/331; 455/432.1; 455/436

(58) Field of Classification Search ........... 370/331; 455/432.1, 436
See application file for complete search history.

(56) References Cited

U.S. PATENT DOCUMENTS

| | | | | |
|---|---|---|---|---|
| 5,896,373 | A * | 4/1999 | Mitts et al. | 370/331 |
| 6,243,582 | B1 * | 6/2001 | Lahtinen | 455/436 |
| 6,766,168 | B1 * | 7/2004 | Lim | 455/435.1 |
| 6,771,962 | B2 * | 8/2004 | Saifullah et al. | 455/436 |
| 6,912,214 | B2 * | 6/2005 | Madour et al. | 370/340 |
| 6,940,834 | B2 * | 9/2005 | Bakke et al. | 370/331 |
| 6,947,400 | B2 * | 9/2005 | Heller | 370/331 |
| 7,006,472 | B1 * | 2/2006 | Immonen et al. | 370/332 |
| 7,079,511 | B2 * | 7/2006 | Abrol et al. | 370/331 |
| 7,110,377 | B2 * | 9/2006 | Hsu et al. | 370/331 |
| 7,136,635 | B1 * | 11/2006 | Bharatia et al. | 455/422.1 |
| 7,139,829 | B2 * | 11/2006 | Wenzel et al. | 709/232 |
| 7,200,126 | B2 * | 4/2007 | Lim | 370/331 |
| 7,283,495 | B2 * | 10/2007 | Lee et al. | 370/331 |
| 7,441,269 | B2 * | 10/2008 | Jones et al. | 726/14 |

(Continued)

FOREIGN PATENT DOCUMENTS

CA 2 359 040 A 3/2002

(Continued)

OTHER PUBLICATIONS

R. Bhalla et al, "Releasing Resources in Mobile IP", XP-002233385, 8 pages, Internet draft, Feb 27, 2001.*

*Primary Examiner*—Duc M Nguyen
(74) *Attorney, Agent, or Firm*—Garlick Harrison & Markison; James A. Harrison; Kevin L. Smith (57) ABSTRACT

A method and apparatus in accordance with the present invention provide for releasing resources dedicated to a dormant mobile station in a region served by a first network access server that has migrated to in a region in an IP network served by a second network access server to allow those released resources to be allocated more efficiently. Generally the invention includes defining logic with a Authentication, Authorization and Accounting facility (AAA) and within a network access server for triggering a release of network access server (NAS) resources allocated for a given Mobile Station (MS) when the MS moves to a physical location requiring service by a different NAS.

8 Claims, 8 Drawing Sheets communication network

U.S. PATENT DOCUMENTS

| | | | |
|---|---|---|---|
| 7,630,354 B2 * | 12/2009 | Madour et al. | 370/340 |
| 2002/0057658 A1 * | 5/2002 | Lim | 370/331 |
| 2002/0167905 A1 * | 11/2002 | Wenzel et al. | 370/249 |
| 2004/0002337 A1 * | 1/2004 | Wheeler et al. | 455/445 |
| 2004/0260752 A1 * | 12/2004 | Chandra et al. | 709/200 |
| 2005/0073969 A1 * | 4/2005 | Hart et al. | 370/318 |

FOREIGN PATENT DOCUMENTS

| | | |
|---|---|---|
| EP | 1 191 763 A | 3/2002 |
| WO | WO 01 80591 A | 10/2001 |

* cited by examiner

FIG. 1
communication network

FIG. 2
mobile IPv4 signal flow

FIG. 3
session context transfer signal flow

FIG. 4
simple IP signal flow

FIG. 5
mobile IPv6 signal flow

FIG. 6

FIG.7   method for triggering the release of Packet Data Serving Node (PDSN) resources

RESOURCE OPTIMIZATION IN A WIRELESS IP NETWORK

CROSS-REFERENCE TO RELATED APPLICATIONS

This application claims priority to and incorporates by reference U.S. Provisional Application entitled, "Method for Releasing Resources in a Wireless IP Network when a Mobile is no Longer Supported by a Given PDSN", having a Ser. No. 60/371,845 and a filing date of Apr. 11, 2002, expired, and "Method for Releasing Resources in a Wireless IP Network when a Mobile is no Longer Supported by a Given PDSN", having a Ser. No. 60/373,357 and a filing date of Apr. 17, 2002, expired.

SPECIFICATION

BACKGROUND

1. Field of the Invention

The present invention relates to mobile communication devices and, more particularly, the present invention relates to mobile stations communicating in a mobile Internet protocol (IP) network.

2. Related Art

The Internet, as we know it today, began as a joint project between the Department of Defense's (DoD's) Advanced Research Project Agency (ARPA) and the United Kingdom's National Physics Lab (NPL) during the height of the Cold War. When planning started in 1967, the project was conceived to distribute communications and data through a dispersed network of highly interconnected network nodes with high redundancy. A decision was made, based on research at the NPL, to move data through the network using a technique called "message switching", or packet switching as it is called today. In order to exchange data, each node was assigned a unique address in relation to the addresses assigned to all other nodes. The address scheme devised was a 32-bit number comprising a network part and a host (network node) part. By 1971, 15 nodes, mostly at universities, were connected to the ARPA network (ARPANET). They were linked for timesharing to support a variety of remote terminals and allowed data transfers between distant computers.

The early 1970s produced a number of products that would effect the development of the ARPANET. The Palo Alto Research Center (PARC), funded by Xerox Corporation, developed a graphical user interface (GUI), a computer pointing device called a mouse, and most importantly, an Ethernet protocol, for inter-connecting computers that allowed users to send and receive electronic mail and share files.

At the same time that ARPANET was being developed for institutional use, the first personal computer was introduced by Altair in 1975. Sold as a kit, it was an instant success with computer enthusiasts but its sales were limited due to the technical skill required to assemble the kit. It did, however, confirm that a market existed for a personal computer. Thus, in 1981, International Business Machines (IBM) introduced the Personal Computer (PC) which became the defacto industry standard. The IBM PC was an open architecture machine, meaning IBM published all technical details of the PC. This fact allowed low cost providers to produce PC "clones" so consumers were able to purchase personal computers at affordable prices. Low cost dial-up modems allowed PC users to download files from bulletin boards.

By the late 1980s, the ARPANET was almost 20 years old. The DoD split the ARPANET into two distinct parts for specific uses. One part was reserved for military sites (known as MILNET), while the second part of ARPANET was for civilian use. Management of the ARPANET was turned over to the National Science Foundation (NSF) with NSF regional networks forming the backbone of the re-named Internet. Commercial Internet service providers (ISPs) began offering Internet access points (APs) through which large numbers of PC users began accessing the Internet. These PCs were desktop machines whose location was not likely to change, thus creating a home network for ISPs.

As technology evolved, smaller, more powerful laptop PCs became available. Their size released them from the desktop and the office. Sales, marketing, and technical personnel could take the laptop PCs on the road while maintaining contact with the office through remote applications such as e-mail and file transfers. These laptop PCs created mobile users that wanted to access the Internet while moving between networks, thereby causing a transition from a centralized system to a distributed system. Advances in wireless technology made wireless networking possible. Using a mobile IP protocol, laptop PCs, personal digital assistants (PDAs) and mobile phones equipped for web browsing could access the Internet. Using either a static or dynamic mobile IP address assigned by their home networks, these mobile users or mobile stations accessed the Internet from any available Internet access point.

When a mobile station changes its access point from its home network to a foreign network, it does not change its IP address. Rather, an assigned IP address attaches to the mobile station as it moves from an area served by one packet data service node (PDSN) to an area served by a different PDSN. Home agents (HAs) are special servers responsible for routing data packets to absent mobile stations. The HA is informed of the absent mobile station's location when the mobile station registers with the foreign network. The server on the foreign network, the foreign agent (FA), also a PDSN, provides its IP address (care-of address) to the HA during mobile station registration. After registration, the FA is responsible for routing data packets between the mobile station and home network via the HA.

One problem with current IP networks is that there are no provisions for releasing resources between a mobile station and a PDSN if the mobile station, while in a dormant state, transitions from a first area served by a first PDSN to a second area served by a second PDSN. Currently, resources are released for a dormant mobile station after the expiration of a long timer (e.g. PPP inactivity timer). Thus, if a dormant mobile station transitions from the first area to the second area, the resources are maintained in the first area served by the first PDSN even though there is no likelihood that the dormant mobile station will become active within that first area (unless it comes back to the first area in a dormant state w/o changing the state that it maintained in the first area). Thus, system resources are wasted. A need exists, therefore, for a mechanism for releasing resources within an area served by a PDSN for a context of a mobile station that has transitioned to another area while in a dormant mode.

SUMMARY OF THE INVENTION

A method and apparatus in accordance with the present invention provide for releasing resources dedicated to a dormant mobile station in a region originally served by a first network access server (e.g. PDSN) that has migrated to a region in a mobile IP network served by a second network access server to allow those released resources to be allocated more efficiently. Generally the invention includes defining logic within a home Authentication, Authorization and Accounting facility (HAAA) and within a network access server (such as a packet data service node) and associated steps for triggering a release of network access server (NAS) resources allocated for a given Mobile Station (MS) for an Internet Protocol (IP) session or context when the MS moves to a physical location requiring service by a different NAS.

Generally, the HAAA includes logic for responding to receiving an access request signal from a new NAS for a mobile station that is presently registered to an old NAS wherein the mobile station initially registered with the old NAS to establish the mobile IP session and then transitioned to a dormant state prior to moving from an area served by the old NAS to an area served by the new NAS. Accordingly, the HAAA includes logic for determining, from evaluating a mobile station ID within the access request, that the mobile station for which the new NAS generated the access request is currently registered to the old NAS. Further, the logic prompts the NAS to generate a disconnect request signal either to the new NAS (for delivery to the old NAS) or directly to the old NAS to prompt the old NAS to release IP session resources allocated for the mobile station. Accordingly, the resources are released for use by another mobile station. The mobile station is one of a data packet service type including a general radio packet services (GPRS) terminal, a 1xEV-DO terminal, a 1xEV-DV terminal, and a 1xRTT terminal, or a WLAN (IEEE 802.1x) device.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
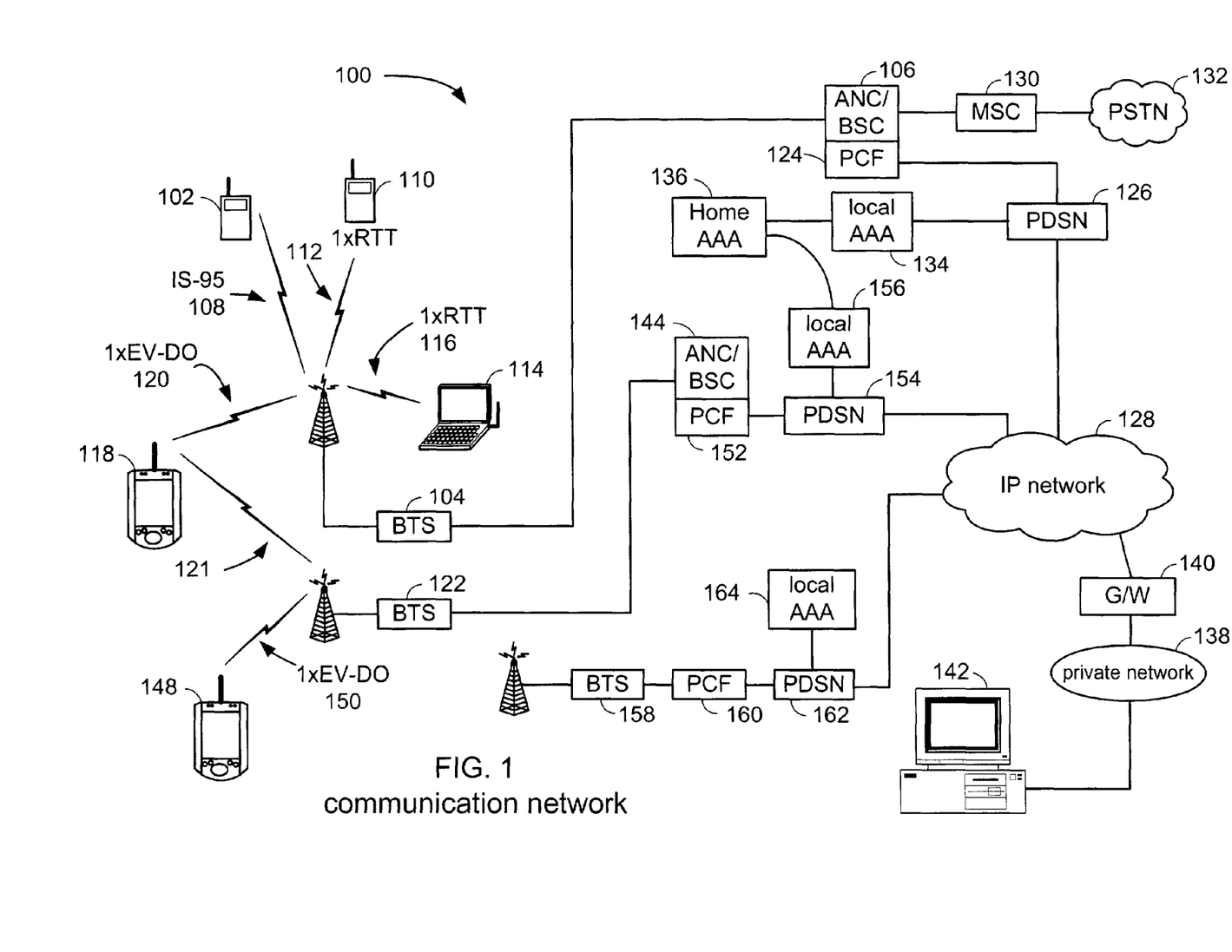
FIG. 1 is a functional block diagram of a communication network formed according to one embodiment of the present invention.

FIG. 1 is a functional block diagram of a communication network formed according to one embodiment of the present invention. As may be seen, a communication network 100 includes many networks that are coupled to operatively communicate with each other to enable a user in one type of network to communicate with a user in a different type of network. For example, the communication network 100 creates an ability for a wire line user terminal coupled to a private network to communicate with a mobile station through a wireless communication link. Such transparent operation with respect to the user is improving access to information and the ability for individuals to communicate to a level that is unprecedented. Existing wireless networks have, heretofore, been adapted primarily for carrying voice calls. Accordingly, when used in conjunction with a computer terminal, the wireless voice networks were able to transmit or receive data at rates that today are viewed as unacceptably slow although they were appreciated at the outset.

Along these lines, a mobile station 102 is located within a geographic area served by a Base Transceiver Station (BTS) 104 that is coupled to an Access Network Controller (ANC)/Base Station Controller (BSC) 106. More specifically, mobile station 102 communicates with BTS 104 by way of an IS-95 CDMA wireless communication network link shown generally at 108. Similarly, a mobile station 110 that is capable of supporting both voice and data calls communicates with BTS 104 over a wireless communication link shown generally at 112 and establishes either voice calls or data calls under CDMA2000 1xRTT protocols. In the example herein, mobile station 110 is engaged in a voice call, as defined by a service option generated by the mobile station during call setup, and thus wireless communication link 112 is transmitting merely voice signals and associated control signaling.

Similarly, a mobile station 114 is engaged in a data call (data session) according to 1xRTT protocols over a wireless communication link shown generally at 116. Finally, an access station 118 is engaged in a data session over a wireless communication link, shown generally at 120, according to 1xEV-DO protocols in a so called "simple-IP" or "mobile-IP" network, as those terms are understood by one of average skill in the art. Additionally, access terminal 118 is transitioning to an area served by BTS 122 shown generally by communication link 121. In general, simple-IP and mobile-IP networks do not include control-signaling protocols that are as extensive as some existing systems. In particular, simple-IP and mobile-IP networks do not include a "heartbeat" mechanism used to determine that a wireless terminal is present and operational.

Continuing to examine FIG. 1, BTS 104 is generally coupled to communicate with ANC/BSC 106 (or with a plurality of packet control function cards there within). As is understood by one of average skill in the art, access network controllers and base station controllers have similar functionality. Moreover, Packet Control Function (PCF) cards can be installed either within a BSC or within an ANC according to whether the PCF is to communicate with a 1xRTT device or a 1xEV-DO device, respectively. It is to be understood that the BSC and ANC elements may readily be formed as stand alone units, but are shown herein as combined systems for illustration.

Within ANC/BSC 106, a plurality of different wireless network cards is included to facilitate communications with mobile stations and mobile terminals of differing protocols and types. The plurality of different network cards is illustrated by PCF 124 of FIG. 1. For example, ANC/BSC 106 includes wireless network cards to communicate with mobile station 102 over IS-95 CDMA wireless communication network link as shown generally at 108, to communicate with mobile station 114 over 1xRTT communication link shown generally at 116, and to communicate with mobile station 118 over 1xEV-DO communication link shown generally at 120. As may be seen, PCF 124 is coupled to a Packet Data Serving Node (PDSN) 126 for routing data packets to mobile IP network 128. Thus, access station 118 that communicates over wireless communication link 120 according to 1xEV-DO communication protocols, communicates with BTS 104 and with PCF 124 formed within ANC/BSC 106. It is understood, of course, that PCF 124 may readily be formed as a distinct device rather than within a rack of ANC/BSC 106. Moreover, PCF 124 may communicate with access station 118 through distinct radio equipment and, thus, through a BTS other than BTS 122 as shown herein.

ANC/BSC 106 is further coupled to Mobile Switching Center (MSC) 130 for routing voice calls to a Public Switched Telephone Network (PSTN) 132. Accordingly, calls routed through MSC 130 are directed either to other MSCs (not shown herein) or to external networks by way of PSTN 132. The reference to PSTN herein includes SS7 and other similar "intelligent networks". Thus, a gateway device (not shown herein) coupled to PSTN 132, may be used to access a data packet network, such as mobile IP network 128. Mobile IP requests processed by PCF 124 are forwarded by PDSN 126 for authentication by a local Authentication, Authorization and Accounting (AAA) server 134 that receives subscriber information from home AAA server 136.

As may further be seen, IP network 128 is coupled to a private network 138 by way of a gateway device 140. Private network 138 further is coupled through traditional wire line networks to a user terminal 142.

Continuing to refer to FIG. 1, ANC/BSC 144 is coupled to BTS 122, which is in communication with access terminal 148 by way of a 1xEV-DO communication link 150. As may be seen, access terminals 118 and 148 are served by PCF 152, which is further coupled to PDSN 154. Access terminal authorization is verified by home AAA server 136 through access request messages transmitted by local AAA server 156.

Additionally, BTS 158 is coupled to PCF 160 that, in turn, is coupled to communicate with PDSN 162. Local AAA server 164 authenticates mobile IP users prior to granting access to mobile IP network 128. Thus, a mobile station, such as mobile station 118, may communicate with one of BTS 104, BTS 122, and BTS 158. PCF 160, as may be seen, is a standalone system rather than being integrated as a card in an ANC or a BSC.

As will be described in greater detail below, any one of the mobile stations or access terminals may communicate with a device by way of mobile IP network 128 through a plurality of PDSNs. In the described embodiment, the mobile station is registered with a serving PDSN then transitions to a new area served by a new PDSN while in a dormant state. Accordingly, the new PDSN allocates resources and establishes a data session with the mobile station even though resources are still allocated with the old PDSN. The resources allocated by the old PDSN are unused but are not released until expiration of a system metric. The method of the present invention solves the duplication of allocated resources by initiation of a PDSN resource release process as will be discussed with reference to the following figures. Accordingly, unused network resources are released and efficiency is improved.

Figure 2:
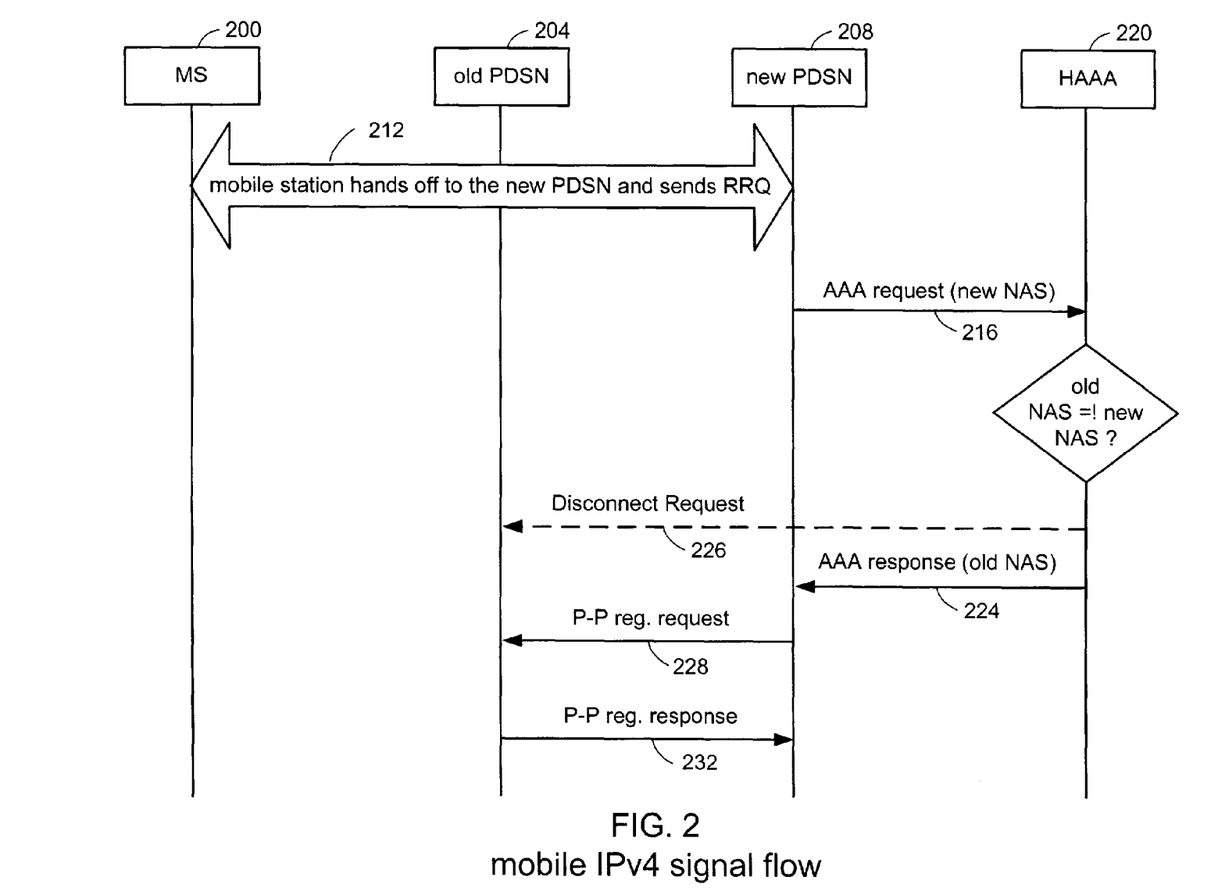
FIG. 2 is a signal sequence diagram that illustrates a method for notifying an old PDSN about a dormant mobile station's movement into a new PDSN area.

FIG. 2 is a signal sequence diagram that illustrates a method for notifying an old PDSN about a dormant mobile station's movement into a new PDSN area. During such a mobility event, the current procedures in TIA/EIA/IS-835-B for Simple IPv4/6 or Mobile IPv4 access do not notify the old PDSN unless fast handoff is fully supported in the radio access networks (RANs) and PDSNs of both the serving and target networks. All the resources in the old PDSN remain tied up until the Mobile IPv4 registration lifetime or PPP inactivity timer expires. This may result in sheer waste of resources and may possibly degrade network capacity when the CDMA2000 networks grow. As long as a mobile station is in a session with one PDSN, or more generically, a network access server (NAS), it cannot be given access to a new NAS for a new IP session. Thus, FIG. 2 generally illustrates a solution that takes advantage of an AAA server's knowledge of the current PDSN (NAS address) for a mobile user (network access identifier [NAI]).

Continuing with the discussion of FIG. 2, mobile station 200, currently registered with old PDSN 204, roams into a coverage area of new PDSN 208. Each radio access network transmits a Packet Zone Identification (PZID) in overhead messages. The mobile station, having received the new PZID, determines it is in the coverage area of new packet zone and registers with the radio access network and then attempts to setup a packet data (IP session) with the PDSN. The radio access network chooses a new PDSN for the mobile (this may happen due to the fact that the old PDSN is unreachable from the new radio access network etc.). The mobile station initiates a packet data session with a new PDSN (establish link layer) and then sends out a registration request (RRQ) 212.

New PDSN 208 sends AAA request 216 to home AAA server (HAAA) 220 containing MS 200 network access identifier (NAI), new PDSN 208 network access server (NAS) IP address, and other parameters to authenticate/authorize MS 200 based on its NAI.

When MS 200 registered with old PDSN 204, the old PDSN NAS IP address was transmitted to HAAA 220. Home AAA server 220 compares the old PDSN's NAS IP address with that of the new PDSN's NAS IP address received in AAA request 216. If they are not the same and the HAAA did not receive an accounting-stop message from the old NAS yet, then HAAA 220 decides to include the NAS IP address of old PDSN 204 in AAA response 224.

At this stage, HAAA 220 sends back AAA response 224. Since the old and the new NAS addresses will not be the same in this scenario, the AAA reply message will contain the the old PDSN's NAS IP address.

Upon receipt of the old PDSN's NAS IP address, new PDSN 208 will send PDSN-PDSN (P-P) registration request 228 to the old PDSN 204 with an appropriate indicator (e.g., normal vendor specific extension [NVSE]) to release all resources for the mobile station. Upon receipt of P-P registration request 228, old PDSN 204 releases all allocated resources for the mobile station and returns P-P registration response 232 to new PDSN 208 as a confirmation.

Figure 3:
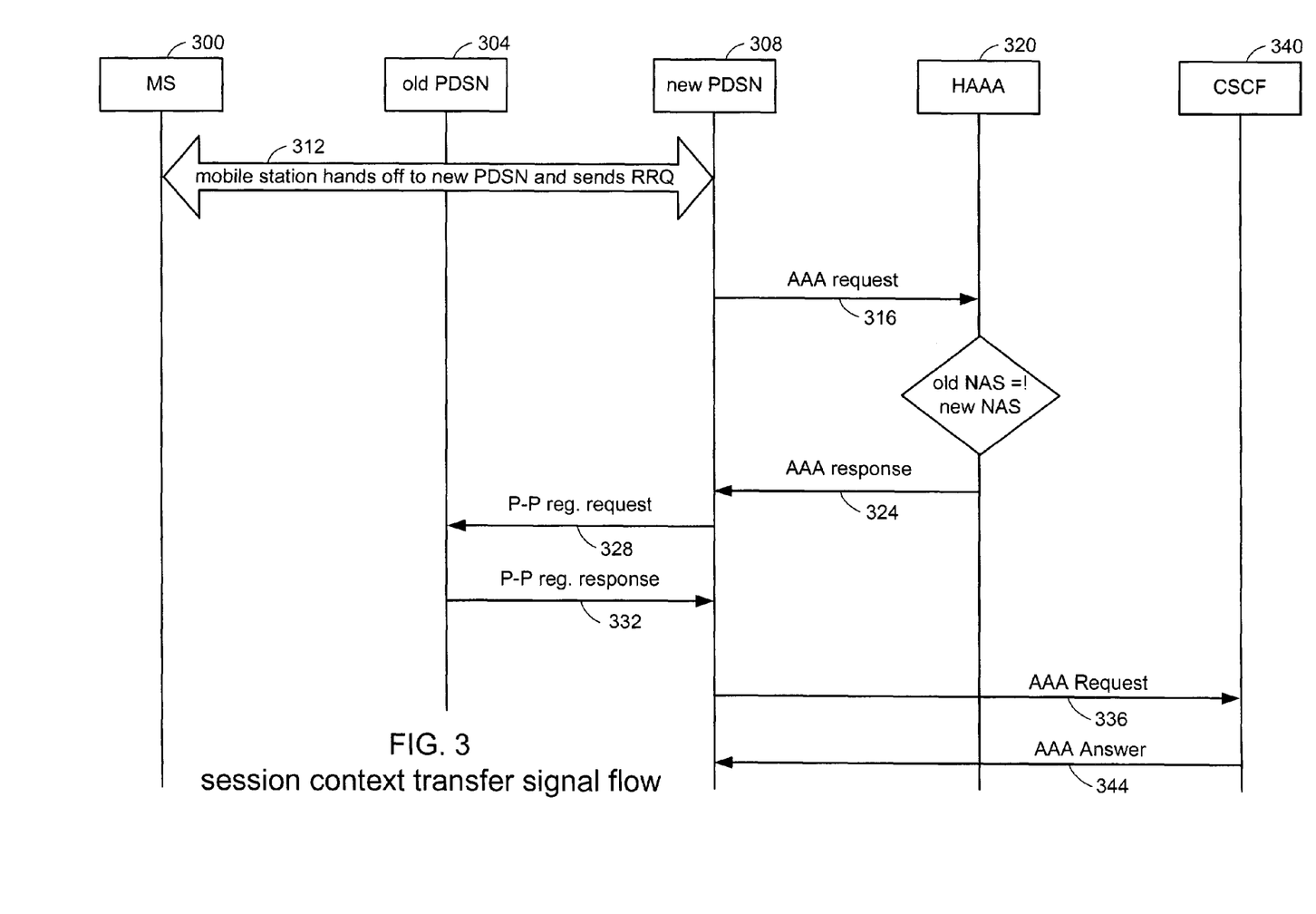
FIG. 3 is a signal sequence diagram that illustrates session context transfer.

FIG. 3 is a signal sequence diagram that illustrates session context transfer. In this example, a mobile station has roamed into an area controlled by new PDSN 308. The signal sequence 300-332 is identical to signal sequence 200-232 as described in FIG. 2, wherein new PDSN 308 initiates release with old PDSN 304 to clean up resources.

Session-based calls, such as multimedia calls, Voice-over-IP calls, etc., often function according to Session Information Protocol (SIP). The signal sequence shown in FIG. 3 includes additional signals to associate new session context between new PDSN 308 with the existing (proxy) SIP server, Session Context Manager (SCM) or Call Server Control Function (CSCF). As is used herein, CSCF refers to what was formerly known as an SCM. This update is performed since the session identifiers/tokens (along with other session-specific information) are exchanged between the serving PDSN and the CSCF.

Upon receipt of an AAA response 324 that contains an NAS-IP address attribute, new PDSN 308 sends AAA Request message 336 containing the NAI of the mobile station to CSCF 340 to update the identifiers/tokens within CSCF 340. The CSCF 340 then caches the new PDSN address with all sessions associated with the NAI.

The CSCF 340 sends new PDSN 308 a AAA Answer message 344 containing all tokens for all sessions associated with the NAI. The token is an identifier for the session established by the NAI. Upon receipt of AAA Answer message 344, new PDSN 308 caches the identifiers/tokens for all sessions associated with the NAI. An Attribute Value Pair (AVP), an extension of the AAA message, is used to enable token and other session-specific information exchanges between the CSCF and PDSNs. For example, session information will include tokens for multi-media applications and voice-over-IP.

Note that the above steps are based on current Mobile IPv4 (RFC 3344) or Simple IPv4/v6. These steps are also applicable for the Mobile IPv6 handoff scenarios as set forth below.

Figure 4:
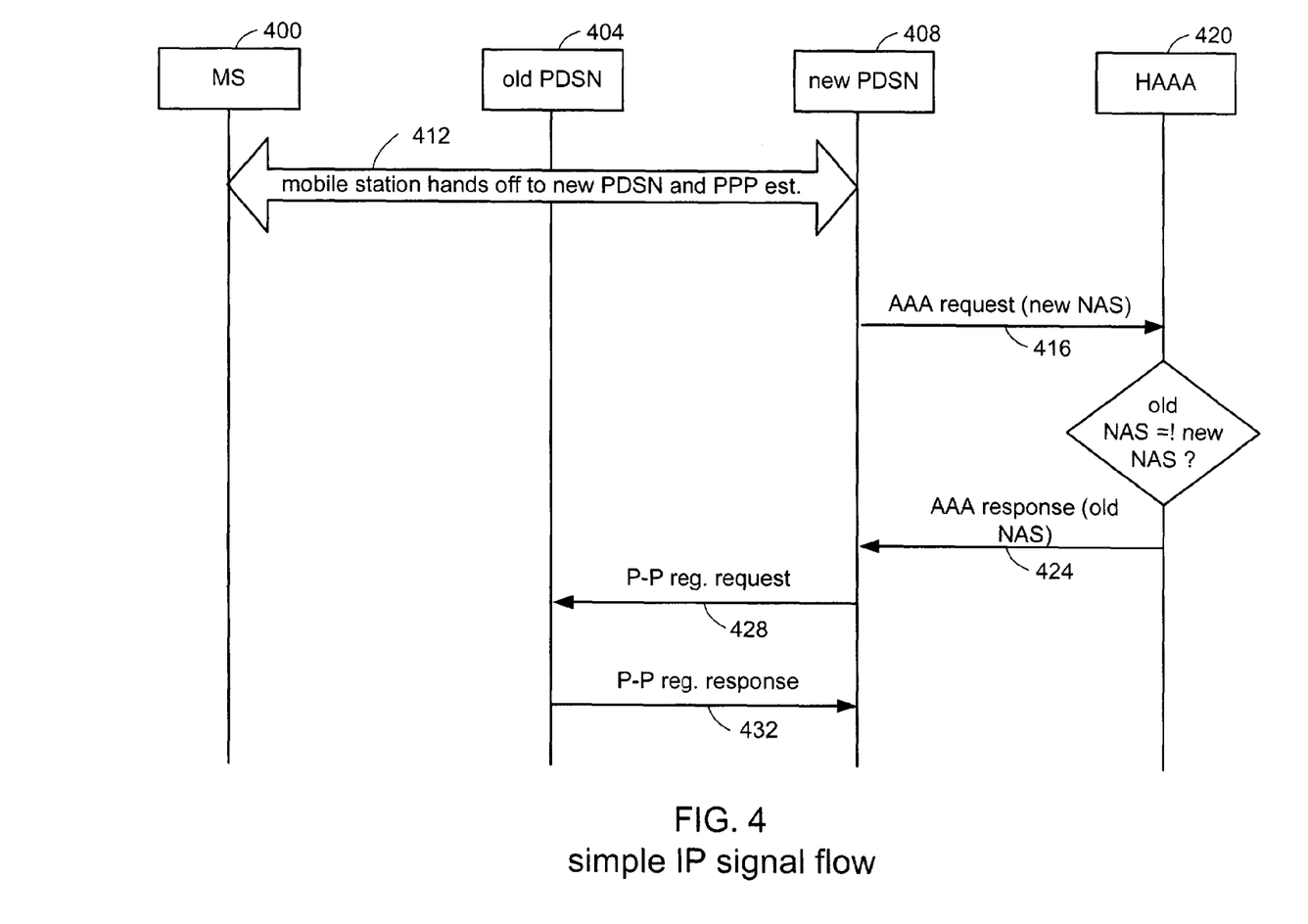
FIG. 4 illustrates a simple IP signal sequence diagram.

FIG. 4 illustrates a simple IP signal sequence diagram. The signal sequence of FIG. 4 is identical to the signal sequence of FIG. 2 except for the step at which an HAAA gets involved in the authentication/authorization process. The MS starts the PPP establishment procedure (PPP negotiation as is know to one of average skill in the art) with new PDSN 408.

Figure 5:
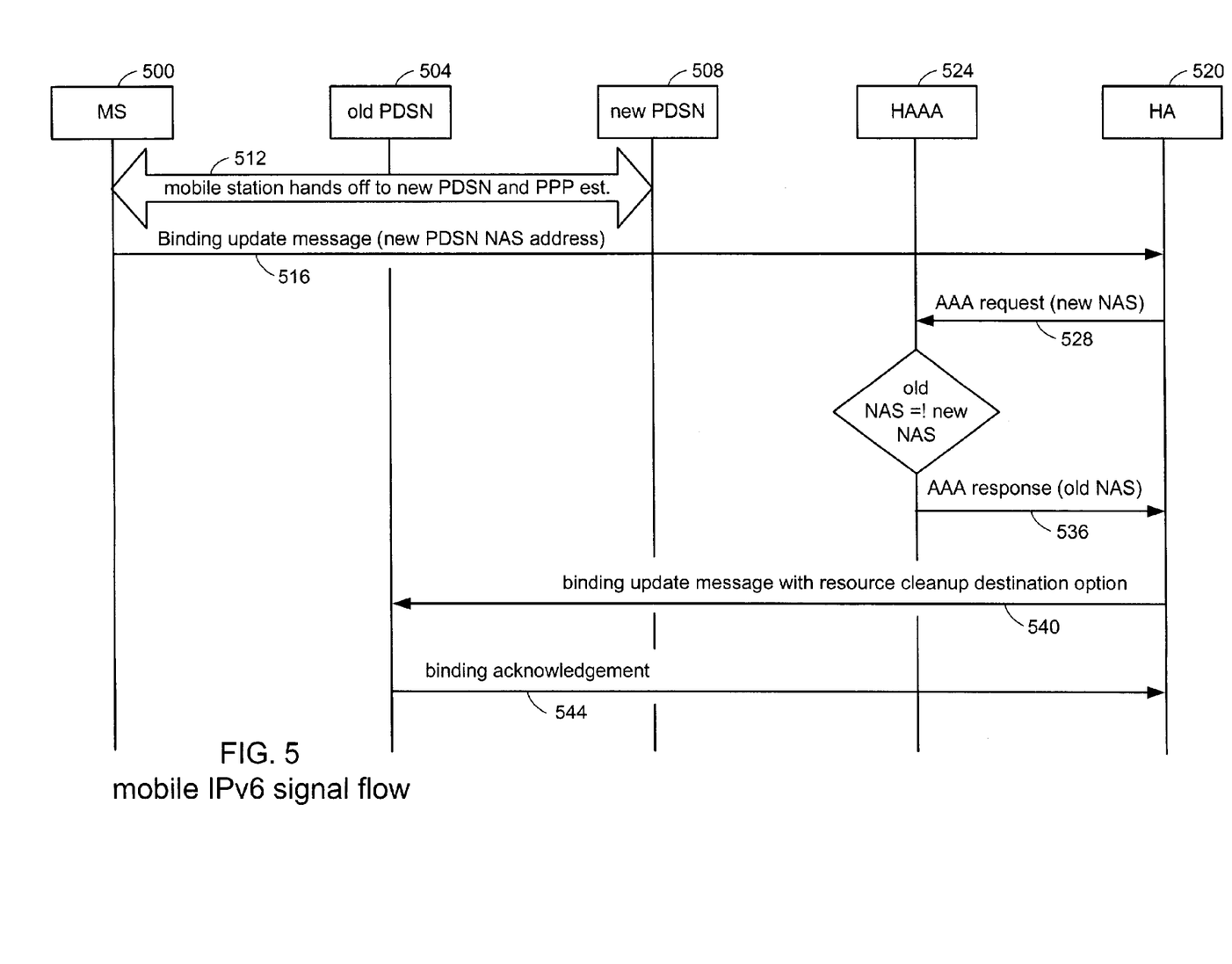
FIG. 5 illustrates signal sequence flow for resource release according to mobile IPv6.

FIG. 5 illustrates signal sequence flow for resource release according to mobile IPv6. In this embodiment of the present invention, a current NAS address is transmitted in a binding update message from an MS to a home agent (HA). The HA may or may not use this address. However, the HA should include the NAS address that it received in the binding update message in a AAA request message. A home AAA compares the new PDSN's address with that of the old PDSN's address and responds back to the HA accordingly. The HA sends the binding update message to the old PDSN to notify it about this event.

Mobile station 500 roams from an area covered by old PDSN 504 to an area covered by new PDSN 508. MS 500 hands off to new PDSN 508 and registers with new PDSN 508 to establish a Point-to-Point protocol 512 as is understood by one of average skill in the art. The MS 500 then sends binding update message 516 with a new PDSN NAS IP address in a destination option to a home agent (HA) 520. The binding update message is used to keep the HA informed of the mobile station's location as it roams from a home network. Upon receipt of binding update message 516 from MS 500, HA 520 tries to authenticate the user with an HAAA 524 by sending AAA request 528. The AAA request 528 includes the new NAS address.

The HAAA 524 compares the old and the new NAS addresses and decides to include the old NAS address in the reply message accordingly. The HAAA 524 responds back to HA 520 with AAA response 536 containing the old NAS address.

Home agent 520 sends a binding update message 540 to the old PDSN (old NAS) to notify old PDSN 504 of the change and to release resources allocated to the mobile station. The old PDSN responds by releasing resources and acknowledges the binding update message with binding acknowledgement 544.

Figure 6:
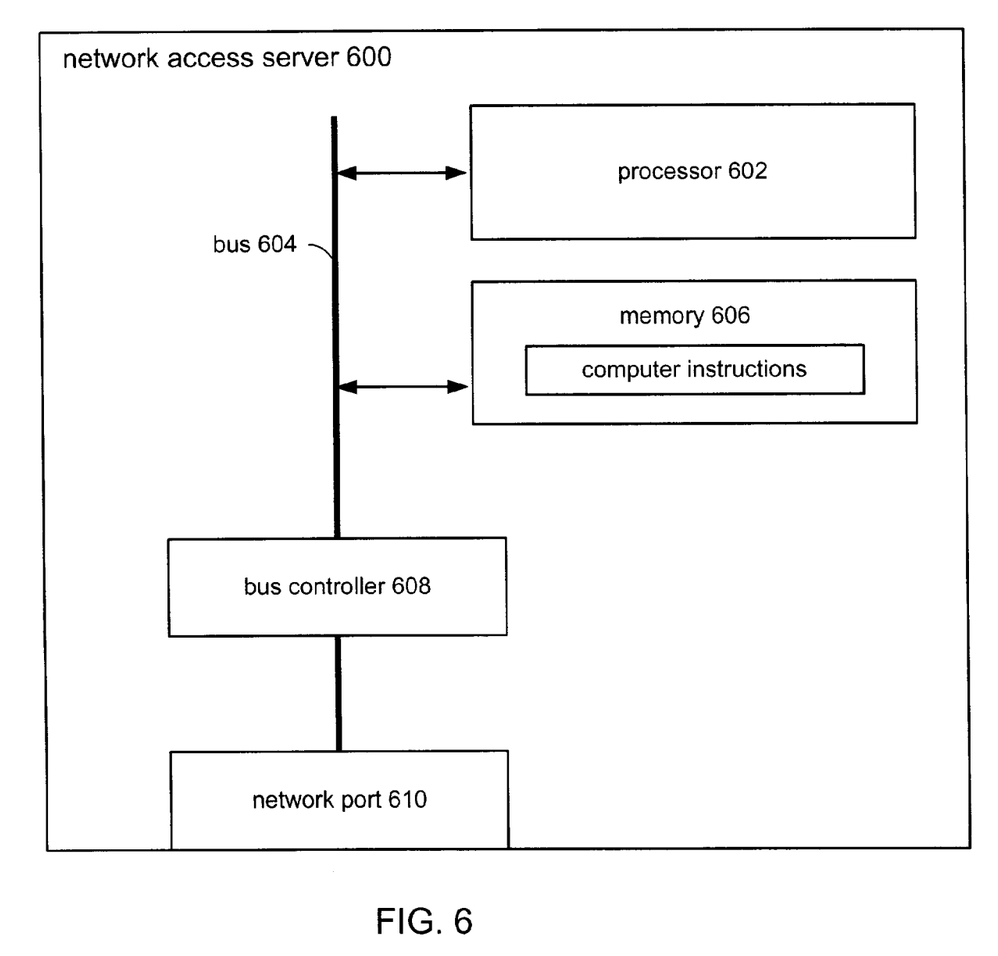
FIG. 6 is a functional block diagram of a network access server (NAS) that illustrates one embodiment of the present invention.

FIG. 6 is a functional block diagram of a network access server (NAS) that illustrates one embodiment of the present invention. It is understood that the NAS is a general term that also refers to and includes devices such as packet data serving nodes, home agents, foreign agents, etc. Moreover, each of these terms refer to logical functions and may be found in the same box. NAS 600 includes a processor 602 that is coupled to communicate over a bus 604. A memory 606 further is coupled to bus 604 and is for storing computer instructions that define the operational logic of NAS 600. For example, the computer instructions define logic for receiving and processing disconnect repairs as described herein. Bus 604 further is coupled to a bus controller 608, which controls the communications and timing of communications thereon. Bus controller 608 is further coupled to a network port 610 that enables NAS 600 to communicate with network elements of a mobile IP network.

In operation, processor 602 communicates with memory 606 by way of bus 604 to retrieve computer instructions stored therein and to execute the computer instructions to operate according to the logic defined within the computer instructions of memory 606. Memory 606 includes computer instructions that define logic for generating mobile IP session information. Memory 606 also includes computer instructions that define the logic for generating a pointer (token) update signal to inform an external call controller that the mobile IP session is being served by a new NAS. Memory 606 further includes instructions defining logic for generating one of a AAA request signal and a Radius request signal to update a token in one of a CSCF.

Memory 606 further includes instructions defining logic for receiving a mobile IP session activation request from a mobile station and, responsive thereto, for generating an access request signal to a AAA server.

Figure 7:
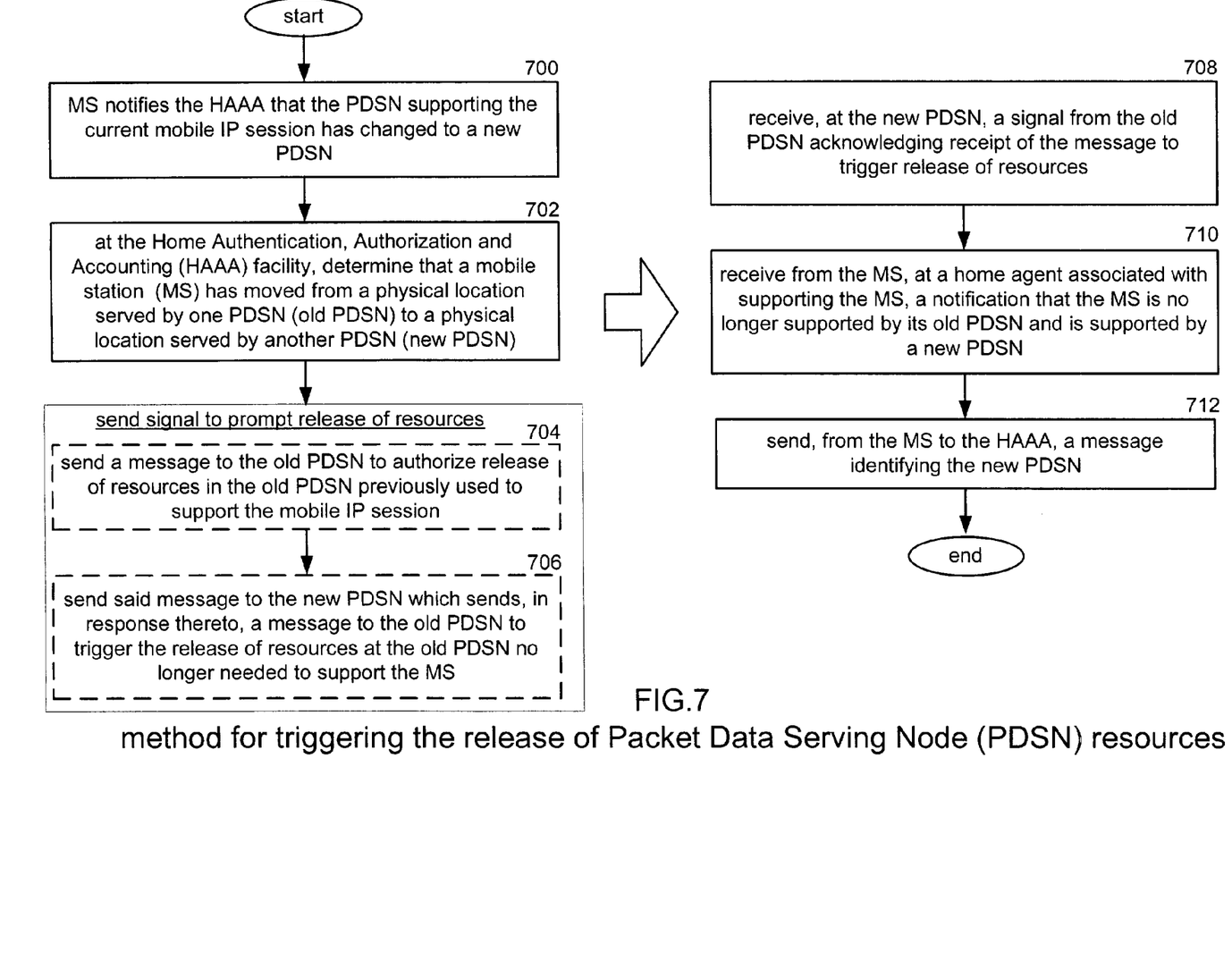
FIG. 7 is a flow chart illustrating a method for triggering the release of packet data serving node (PDSN) resources in a mobile IP session.

FIG. 7 is a flow chart illustrating a method for triggering the release of packet data serving node (PDSN) resources in a IP session. A mobile station (MS) registered with a packet data serving node (PDSN) (old PDSN) roams, while dormant, to a coverage area served by a new PDSN. The MS receives a Packet Zone ID (PZID) identifying that it is in a new packet network area. The radio access network connects the mobile with a new PDSN. The MS attempts to initiate a packet data session with the new PDSN by either initiating a PPP connection (Simple IPv4/v6) or by initiating a PPP connection and Mobile IP Registration Request (Mobile IPv4). The new PDSN contacts a home authentication, authorization, and accounting (HAAA) server to authenticate and authorize the request from the mobile. In the AAA message there is a NAS IP address attribute that contains the new PDSN's NAS-IP address. Upon receiving the AAA message from the new PDSN when an appropriate indication (e.g. AAA Accounting-Stop with session continue attribute=0) has not been received by the AAA server, the AAA server detects that the current IP session has changed to the new PDSN (step 700). The HAAA compares the old PDSN address received from the old PDSN to the new PDSN address. A difference in PDSN addresses determines that the MS has moved from a physical location served by the old PDSN to a physical location served by the new PDSN (step 702). Unless released according to the method of the present invention, the resources allocated to the MS by the old PDSN will be reserved until the expiration of a lifetime timer or a registration timer. This leads to wasted resources and requires resource provisioning that are not needed. The HAAA sends a message to the old PDSN authorizing release of resources previously used by the old PDSN to support the mobile station's IP session (step 704). Alternatively the HAAA sends the message to the new PDSN which will, upon receipt of the message, send a message to the old PDSN to trigger the release of resources at the old PDSN that are no longer needed to support the MS (step 706). FIG. 7 shows blocks 704 and 706 in dashed lines to indicate that either step is alternate in relation to the other step. More generally, one of the two steps should be implemented to achieve the result of the old PDSN releasing resources that are no longer needed to support the MS.

The new PDSN receives a signal from the old PDSN acknowledging receipt of the message to trigger release of resources (step 708). As stated before, the message received to trigger release of resources may have originated from the new PDSN or from the HAAA. A home agent (HA) is a specialized server providing network support and services to mobile stations sharing a subnet of an IP address. The HA associated with supporting the MS, receives a notification from the MS that the old PDSN is no longer supporting by the MS and is supported by the new PDSN (step 710) then send a message to the HAAA identifying the new PDSN (step 712).

Figure 8:
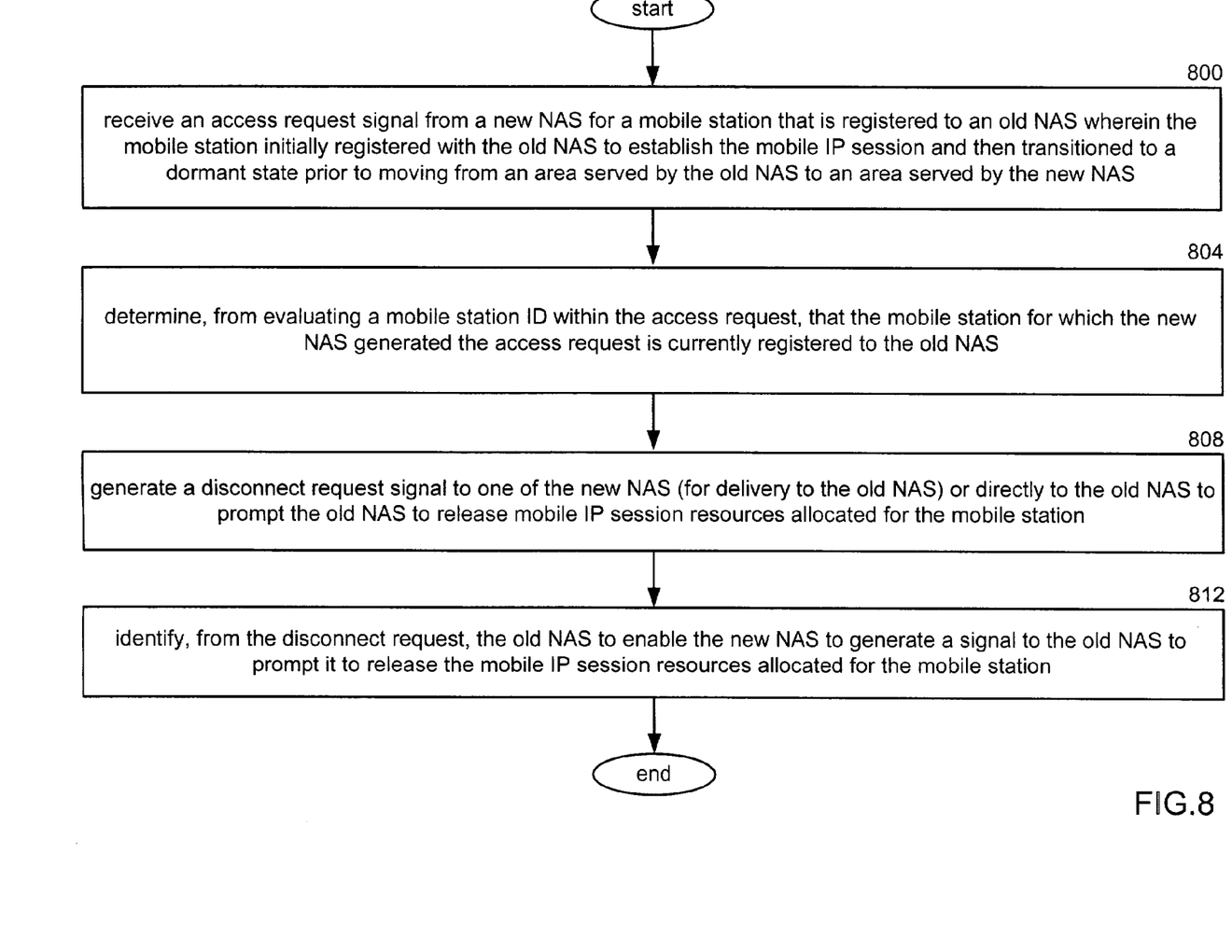
FIG. 8 is a flow chart illustrating a method by a home authentication, authorization, and accounting (HAAA) server for triggering release of Network Access Server (NAS) resources according to the present invention.

FIG. 8 is a flow chart illustrating a method by a home authentication, authorization, and accounting (HAAA) server for triggering release of Network Access Server (NAS) resources according to the present invention. In one embodiment of the present invention, the NAS comprises a packet data serving node (PDSN). A mobile station registered with a NAS (old NAS) roams, while dormant, to a coverage area served by a new NAS. The HAAA server receives an access request signal from the new NAS to establish an IP session for the mobile station (step 800). The access request signal is used by the NAS to verify the MS identify prior to granting access to the IP network. Once access is granted, the NAS allocates IP session resources for the duration of the IP session or until terminated according to data contained in a mobility binding. The access request contains, among other data, the old NAS address and the mobile station ID. The HAAA determines, from evaluating the mobile station ID within the access request, that the mobile station is currently registered with the old NAS (step 804). Without the method of the present invention, the new NAS will allocate IP session resources thus duplicating the old NAS allocation of hardware and software resources. The HAAA generates a disconnect request signal (AAA response signal) to one of the new NAS (for delivery to the old NAS) or directly to the old NAS to prompt the old NAS to release IP session resources allocated for the mobile station (step 808). The disconnect request identifies the old NAS to enable the new NAS to prompt it to release the IP session resources allocated for the mobile station (step 812).

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for reducing allocated resource duplication in an Internet Protocol (IP) session by triggering the release of Packet Data Serving Node (PDSN) resources allocated for use with a Mobile Station (MS) when the MS moves to a physical location requiring service by a different PDSN, the method comprising:

identifying at a Home Authentication, Authorization and Accounting (HAAA) facility that the MS has moved from a physical location served by a first PDSN to a physical location served by a second PDSN, the MS having transitioned to a dormant state prior to moving to the physical location served by the second PDSN and prior to an expiration of a system metric of the first PDSN; and in response thereto, sending a message to the first PDSN authorizing release of resources in the first PDSN previously used to support the mobile IP session for the MS while in the dormant state, wherein the message to the first PDSN is first sent to the second PDSN which sends, in response thereto, a message to the first PDSN to trigger the release of resources at the first PDSN no longer needed to support the MS.

2. The method of claim 1 wherein the MS notifies the HAAA that the PDSN supporting the current mobile IP session has changed from the first PDSN to the second PDSN.

3. The method of claim 1 further comprising:

receiving, at the second PDSN, a signal from the first PDSN acknowledging receipt of the message sent from the second PDSN to the first PDSN to trigger release of resources.

4. The method of claim 1 wherein a home agent (HA) associated with supporting the MS receives from the MS a notification that it is no longer supported by the first PDSN and is instead supported by the second PDSN and sends a message to the HAAA identifying the second PDSN.

5. A method in a Home Authentication, Authorization and Accounting (HAAA) facility for triggering a release of network access server (NAS) resources allocated for a given Mobile Station for an Internet Protocol (IP) session when the Mobile Station moves to a physical location requiring service by a different NAS, the method comprising:

receiving an access request signal from a second NAS for the Mobile Station registered to a first NAS, the Mobile Station having initially registered with the first NAS to establish the mobile IP session and subsequently transitioned to a dormant state prior to moving from an area served by the first NAS to an area served by the second NAS and prior to an expiration of a system metric of the first NAS;

determining, from evaluating a mobile station ID within the access request signal, that the Mobile Station—for which the second NAS generated the access request signal is currently registered to the first NAS; and generating a disconnect request signal to either the second NAS for delivery to the first NAS or directly to the first NAS to prompt the first NAS to release mobile IP session resources allocated for the Mobile Station while in a dormant state and prior to moving from the area served by the first NAS, wherein the disconnect request signal identifies the first NAS to enable the second NAS to generate a signal to the first NAS to prompt it to release the mobile IP session resources allocated for the Mobile Station.

6. The method of claim 5 wherein each NAS comprises a packet data serving node (PDSN).

7. The method of claim 5 wherein the disconnect request signal comprises an AAA response signal.

8. A Home Authentication, Authorization and Accounting (HAAA) facility, comprising:

means for triggering a release of network access server (NAS) resources allocated by a first NAS for a given Mobile Station (MS) for an Internet Protocol (IP) session when the MS moves to a physical location requiring service by a second NAS, wherein the MS transitions to a dormant state prior to moving to the physical location requiring service by the second NAS and prior to an expiration of a system metric of a first NAS providing the allocated NAS resources, the triggering means include logic for communicating with a first packet data serving node (PDSN) of the first NAS to prompt the first PDSN to release the allocated NAS resources by an AAA response signal;

means for receiving an access request signal from the second NAS for the MS that is registered to the first NAS providing the allocated NAS resources;

means for determining, from evaluating a mobile station ID (MSID) within the access request signal, that the MS for which the second NAS generated the access request signal is currently registered to the first NAS providing the allocated NAS resources; and means for generating the AAA response signal to the second NAS that includes a disconnect request signal identifying the first PDSN to enable a second PDSN of the second NAS to generate a signal for the first PDSN to release the mobile IP session resources allocated for the MS, the AAA response signal for delivery to the first NAS providing the allocated NAS resources or directly to the first NAS providing the allocated NAS resources to prompt releasing of the allocated NAS resources.

* * * * *